(12) United States Patent
Ward

(10) Patent No.: US 7,933,462 B2
(45) Date of Patent: *Apr. 26, 2011

(54) REPRESENTING AND RECONSTRUCTING HIGH DYNAMIC RANGE IMAGES

(75) Inventor: Gregory John Ward, Albany, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 938 days.

This patent is subject to a terminal disclaimer.

(21) Appl. No.: 11/831,630

(22) Filed: Jul. 31, 2007

(65) Prior Publication Data

US 2008/0137990 A1 Jun. 12, 2008

Related U.S. Application Data

(63) Continuation of application No. 11/612,410, filed on Dec. 18, 2006, now Pat. No. 7,747,098.

(51) Int. Cl.
*G06K 9/40* (2006.01)
*G06K 9/36* (2006.01)

(52) U.S. Cl. .................... 382/254; 382/232
(58) Field of Classification Search .......... 382/162, 382/167, 232, 240, 254, 260, 274, 299, 309; 358/1.9, 518, 519, 520, 523, 539; 345/501, 345/590, 629

See application file for complete search history.

(56) References Cited

U.S. PATENT DOCUMENTS

| 4,649,568 | A | 3/1987 | Kiesel |
| 5,621,660 | A | 4/1997 | Chaddha et al. |
| 6,282,311 | B1 | 8/2001 | McCarthy |
| 6,282,312 | B1 | 8/2001 | McCarthy |
| 6,282,313 | B1 | 8/2001 | McCarthy |
| 6,285,784 | B1 | 9/2001 | Spaulding |
| 6,301,393 | B1 | 10/2001 | Spaulding |
| 6,335,983 | B1 | 1/2002 | McCarthy |
| 6,748,106 | B1 | 6/2004 | Bryant |
| 6,754,384 | B1 | 6/2004 | Spaulding |
| 6,775,407 | B1 | 8/2004 | Gindele |
| 6,795,585 | B1 | 9/2004 | Parada |
| 6,822,760 | B1 | 11/2004 | Spaulding |
| 7,305,144 | B2 * | 12/2007 | Fattal et al. ........... 382/274 |
| 2006/0158462 | A1 | 7/2006 | Toyama |

OTHER PUBLICATIONS

Ward, Greg et al., "Subband Encoding of High Dynamic Range Imagery", Proceedings of the 1st Symposium on applied perception in graphics and visualization, Los Angeles, California, 2004, pp. 83-90.
Ward, Greg, "A General Approach to Backwards-Compatible Delivery of High Dynamic Range and Video", Proceedings of the Fourteenth Color Imaging Conference, Nov. 2006.
Mantiuk, Rafal et al., "Perception-motivated High Dynamic Range Video Encoding", Proc. of SIGGRAPH '04, ACM Transactions on Graphics, Aug. 2004, vol. 23, No. 3, pp. 733-741.

(Continued)

*Primary Examiner* — Yon Couso

(57) ABSTRACT

A high dynamic range image can be recovered from a full-resolution lower-dynamic-range image and a reduced-resolution higher-dynamic-range image. Information regarding higher spatial frequencies may be obtained by extracting high spatial frequencies from the lower-dynamic-range image. In some embodiments an approximate impulse-response function is determined by comparing the higher- and lower-dynamic range images. A scaling image obtained by applying the impulse-response function to a high-frequency band of the lower-dynamic range image is combined with an upsampled higher-dynamic range image to yield a reconstructed image.

24 Claims, 9 Drawing Sheets

OTHER PUBLICATIONS

Mantiuk, Rafal et al., "Backward Compatible High Dynamic Range MPEG Video Compression", Proc. of SIGGRAPH '06, (Special Issue of ACM Transactions on Graphics).

Ward, Greg et al., "JPEG-HDR: A Backwards-Compatible, High Dynamic Range Extension to JPEG", Proceedings of the Thirteenth Color Imaging Conference, pp. 283-290.

Spaulding, Kevin et al., "Using a Residual Image to Extend the Color Gamut and Dynamic Range of an sRGB Image", Eastman Kodak Company, 2003, pp. 1-9.

Spaulding, Kevin et al., "Extending the Color Gamut and Dynamic Range of an sRGB Image Using a Residual Image", Color Research and Application, vol. 28, No. 4, Aug. 2003, pp. 251-266.

* cited by examiner

REPRESENTING AND RECONSTRUCTING HIGH DYNAMIC RANGE IMAGES

CROSS REFERENCE TO RELATED APPLICATION

This application is a continuation of U.S. patent application Ser. No. 11/612,410 filed 18 Dec. 2006, entitled "REPRESENTING AND RECONSTRUCTING HIGH DYNAMIC RANGE IMAGES".

TECHNICAL FIELD

The invention relates to high dynamic range digital images. The invention relates specifically to methods and apparatus for encoding and decoding high dynamic range images and to data structures for containing data representing high dynamic range images.

BACKGROUND

Human vision is capable of appreciating contrast ratios of up to 1:10,000. That is, a person can take in a scene in which some parts of the scene are 10,000 times brighter than other parts of the scene and see details in both the brightest and darkest parts of the scene. Further, human vision can adapt its sensitivity to brighter or darker scenes over a further 6 orders of magnitude.

Most conventional digital image formats (so-called 24-bit formats) use up to 24 bits to store color and luminance information for each pixel in an image. For example, each of a red, green and blue (RGB) value for a pixel may be stored in one byte (8 bits). Such formats are capable of representing brightness variations over only about two orders of magnitude (each byte can store one of 256 possible values). There exist a number of standard formats for representing digital images (which include both still and video images). These include JPEG (Joint Photographic Experts Group), MPEG (Motion Picture Experts Group), AVI (Audio Video Interleave), TIFF (Tagged Image File Format), BMP (Bit Map), PNG (Portable Network Graphics), GIF (Graphical Interchange Format), and others. Such formats may be called "output referred standards" because they do not attempt to preserve image information beyond what can be reproduced by electronic displays of the types most commonly available. Until recently, displays such as computer displays, televisions, digital motion picture projectors and the like have been incapable of accurately reproducing images having contrast ratios better than 1:1,000 or so.

Display technologies being developed by the assignee, and others, are able to reproduce images having high dynamic range (HDR). Such displays can reproduce images which more faithfully represent real-world scenes than conventional displays. There is a need for formats for storing HDR images for reproduction on these displays and other HDR displays that will become available in the future.

A number of formats have been proposed for storing HDR images as digital data. These formats all have various disadvantages. A number of these formats yield prohibitively large image files that can be viewed only through the use of specialized software. Some manufacturers of digital cameras provide proprietary RAW formats. These formats tend to be camera-specific and to be excessive in terms of data storage requirements.

There is a need for a convenient framework for storing, exchanging, and reproducing high dynamic range images. There is a particular need for such a framework which is backwards-compatible with existing image viewer technology. There is a particular need for backwards compatibility in cases where an image may need to be reproduced by legacy devices, such as DVD players, which have hardware-based image decoders.

Some Related Publications Include:

Ward, Greg, *A General Approach to Backwards-Compatible Delivery of High Dynamic Range Images and Video*" Proceedings of the Fourteenth Color Imaging Conference, November 2006.

Rafal Mantiuk, Grzegorz Krawczyk, Karol Myszkowski, Hans-Peter Seidel, *Perception-motivated High Dynamic Range Video Encoding*, Proc. of SIGGRAPH '04 (Special issue of ACM Transactions on Graphics).

Rafal Mantiuk, Alexander Efremov, Karol Myszkowski, Hans-Peter Seidel, *Backward Compatible High Dynamic Range MPEG Video Compression*, Proc. of SIGGRAPH '06 (Special issue of ACM Transactions on Graphics).

Greg Ward & Maryann Simmons, *Subband Encoding of High Dynamic Range Imagery*, First Symposium on Applied Perception in Graphics and Visualization (APGV).

Greg Ward & Maryann Simmons, *JPEG-HDR: A Backwards-Compatible, High Dynamic Range Extension to JPEG*, Proceedings of the Thirteenth Color Imaging Conference.

U.S. Pat. No. 4,649,568.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are meant to be exemplary and illustrative, not limiting in scope.

One aspect of the invention provides apparatus for reconstructing a higher-dynamic-range image. The apparatus comprises: a spatial filtering stage configured to process at least a full resolution, lower dynamic range (FRLDR) representation of an image to obtain a scaling image comprising information relating to high spatial frequency components of the FRLDR representation; an upsampling stage configured to upsample a lower resolution, higher-dynamic-range (LRHDR) representation of the image, to obtain an upsampled image; and a combining stage configured to combine the scaling image and the upsampled image to obtain a reconstructed higher-dynamic-range image. The LRHDR representation has a lower resolution and a higher dynamic range than the FRLDR representation.

Another aspect of the invention provides a method for reconstructing a higher-dynamic-range image, The method comprises obtaining a FRLDR representation of the image and a LRHDR representation of the image, The LRHDR representation has a lower resolution and a higher dynamic range than the FRLDR representation. The method processes at least the FRLDR representation to obtain a scaling image comprising information relating to high spatial frequency components of the FRLDR representation and upsamples the LRHDR representation to obtain an upsampled image. The method combines the scaling image and the upsampled image to obtain a reconstructed higher-dynamic-range image.

Further aspects of the invention and features of embodiments of the invention are described below and illustrated in the accompanying drawings.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of this invention provides a data format for representing high-dynamic-range (HDR) images that includes a full-resolution, lower-dynamic-range (FRLDR) image and a lower-resolution, but higher-dynamic-range (LRHDR) image. The (FRLDR) image can be encoded in a way that provides backwards compatibility with existing image formats. The LRHDR image can be used in conjunction with the FRLDR image, as described herein, to provide a full resolution HDR image.

Figure 1:
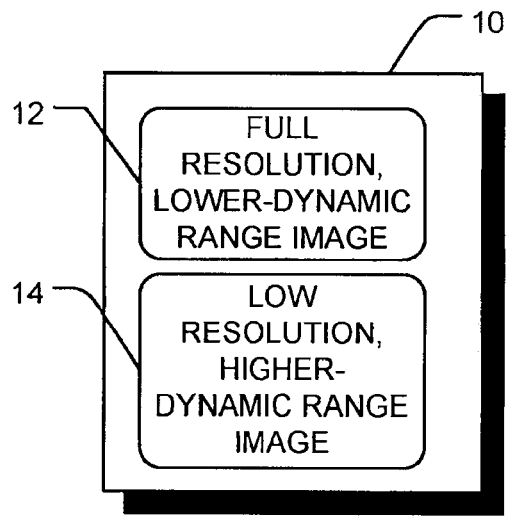
FIG. 1 shows a data structure according to an embodiment of the invention.

FIG. 1 shows a data structure 10 that includes a full-resolution, lower-dynamic-range (FRLDR) image 12 and a lower-resolution, but higher-dynamic-range (LRHDR) image 14. By way of example only, FRLDR image 12 may comprise data representing an image in a 24-bit format. LRHDR image 14 may comprise data representing the same image in a format having a higher dynamic range than that of FRLDR image 12.

Data structure 10 may be readable by legacy image viewers. The legacy image viewers may read data defining FRLDR image 12 and ignore data representing LRHDR image 14.

Each of images 12 and 14 may be compressed in any suitable manner. The same or different compression methods may be used to compress each of images 12 and 14. In one embodiment, data structure 10 has a format that provides main image data and an auxiliary stream and higher-dynamic-range image 14 is in the auxiliary stream. For example, data structure 10 may comprise a JFIF file and FRLDR image 12 may comprise a JPEG image. In some embodiments, data structure 10 comprises a MPEG file and FRLDR image 12 comprises a frame of a MPEG video.

The resolution of LRHDR image 14 is lower than that of FRLDR image 12 in at least one dimension and preferably in both dimensions. For example, the resolution of LRHDR image 14 may be ¼ of that of FRLDR image 12 in both dimensions (so that LRHDR image 14 contains $1/16$th as many pixels as FRLDR image 12).

Figure 2:
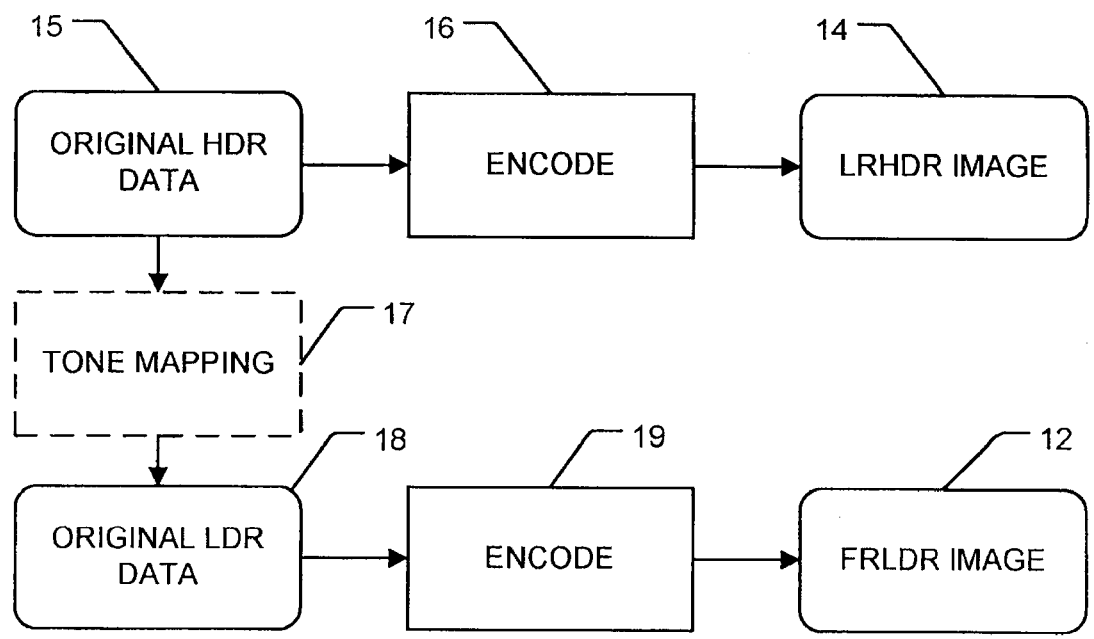
FIG. 2 is a flow chart illustrating a general method for obtaining the FIG. 1 data structure according to a particular embodiment of the invention.

Data structure 10 may be encoded as shown in FIG. 2. Original high-dynamic-range (HDR) data 15 is encoded in block 16 to produce LRHDR image 14. Original lower-dynamic-range (LDR) image 18 is encoded in block 19 to yield FRLDR image 12. Original LDR data 18 may be derived from original HDR data 15, for example, by applying a tone-mapping operator as illustrated in optional block 17. In the alternative, original LDR data 18 may be obtained separately or derived in a different manner from original HDR data 15.

Figure 3:
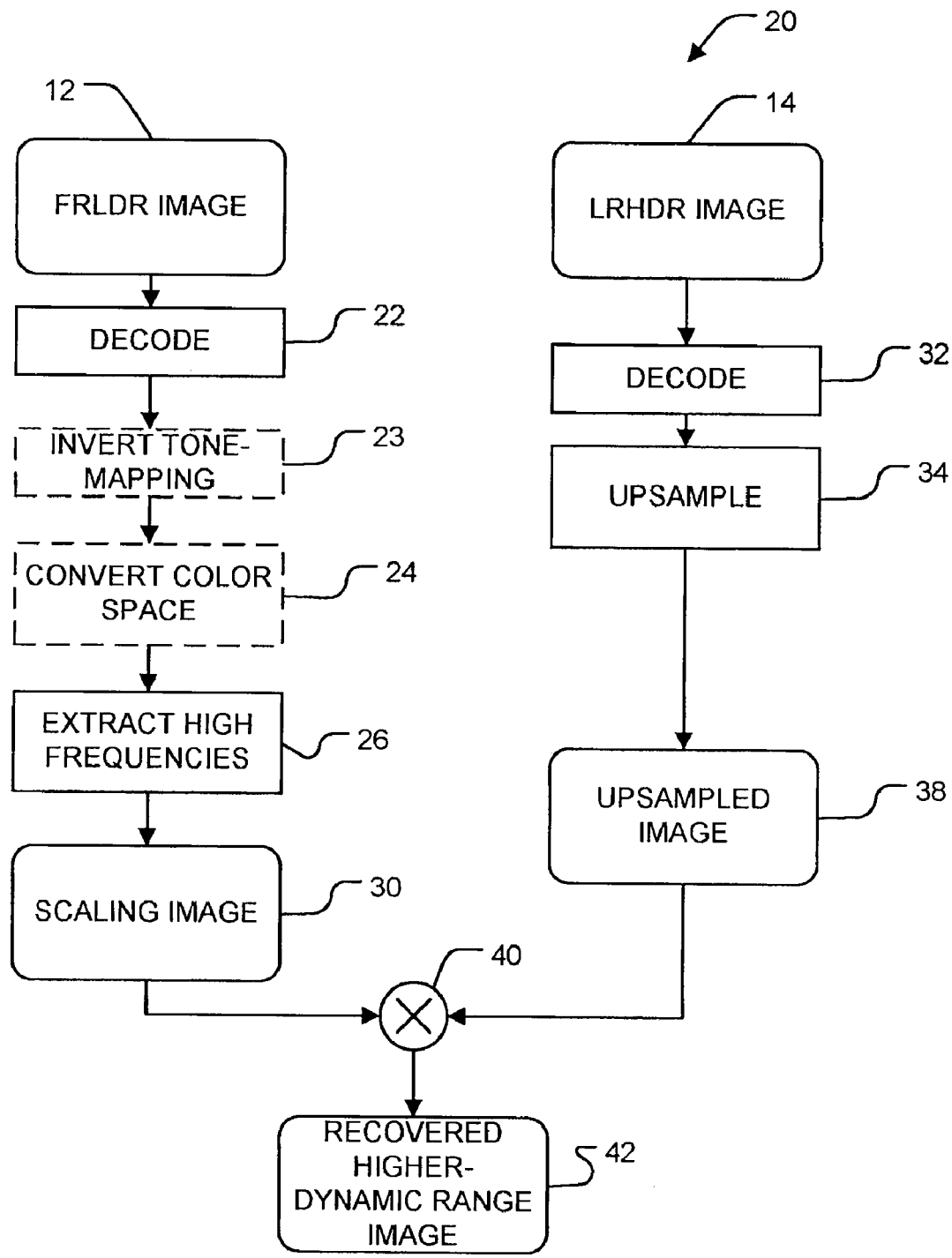
FIG. 3 is a flow chart illustrating a method for recovering high-dynamic-range (HDR) data from the FIG. 1 data structure according to a basic embodiment of the invention.

Basic and more-advanced methods for reconstructing a full-resolution, high-dynamic-range (FRHDR) image from FRLDR image 12 and LRHDR image 14 will now be described. A basic reconstruction method 20 is shown in FIG. 3.

Method 20 decodes FRLDR image 12 and LRHDR image 14, if necessary, in blocks 22 and 32. From FRLDR image 12, method 20 obtains a scaling image 30 comprising information regarding components of FRLDR image 12 having higher spatial frequencies. In some embodiments, the pixels of scaling image 30 have an average value of 1.0.

In some embodiments, method 20 includes a block 23 that inverts the tone-mapping curve used in the creation of FRLDR image 12 (see block 17 of FIG. 2). Processing FRLDR image 12 using such inverted tone mapping can yield improved results (e.g. a better quality recovered FRHDR image) by recovering full contrast in the high frequencies of scaling image 30. In some cases the tone-mapping operator used in the creation of FRLDR image 12 may be unknown or it may be undesirable to incur the added overhead of inverting the tone-mapping curve.

Method 20 converts FRLDR image 12 into the same color space as LRHDR image 14, if necessary, in block 24. Method 20 then extracts high spatial frequency components from the decoded and color-converted FRLDR image 12 in block 26 to yield scaling image 30. Preferably, block 26 extracts those spatial frequencies that are present in FRLDR image 12, but are not present in LRHDR image 14 because of the lower resolution of LRHDR image 14.

In some embodiments, block 26 extracts spatial frequencies that are above a quantization threshold of FRLDR image 12. The quantization threshold may be set high enough that artifacts that arise from the fact that the pixel values of FRLDR image 12 change in discrete steps are ignored.

Method 20 also involves upsampling the decoded LRHDR image 14 in block 34 to the same resolution as scaling image 30 and FRLDR image 12 to yield an upsampled image 38.

Upsampled image 38 is combined with scaling image 30 at block 40 to yield a recovered full resolution, high-dynamic-range (FRHDR) image 42. In the illustrated embodiment, the pixels of scaling image 30 have an average value of 1.0 and combining upsampled image 38 with scaling image 30 comprises multiplying pixel values from upsampled image 38 with corresponding pixel values from scaling image 30.

Figure 3A:
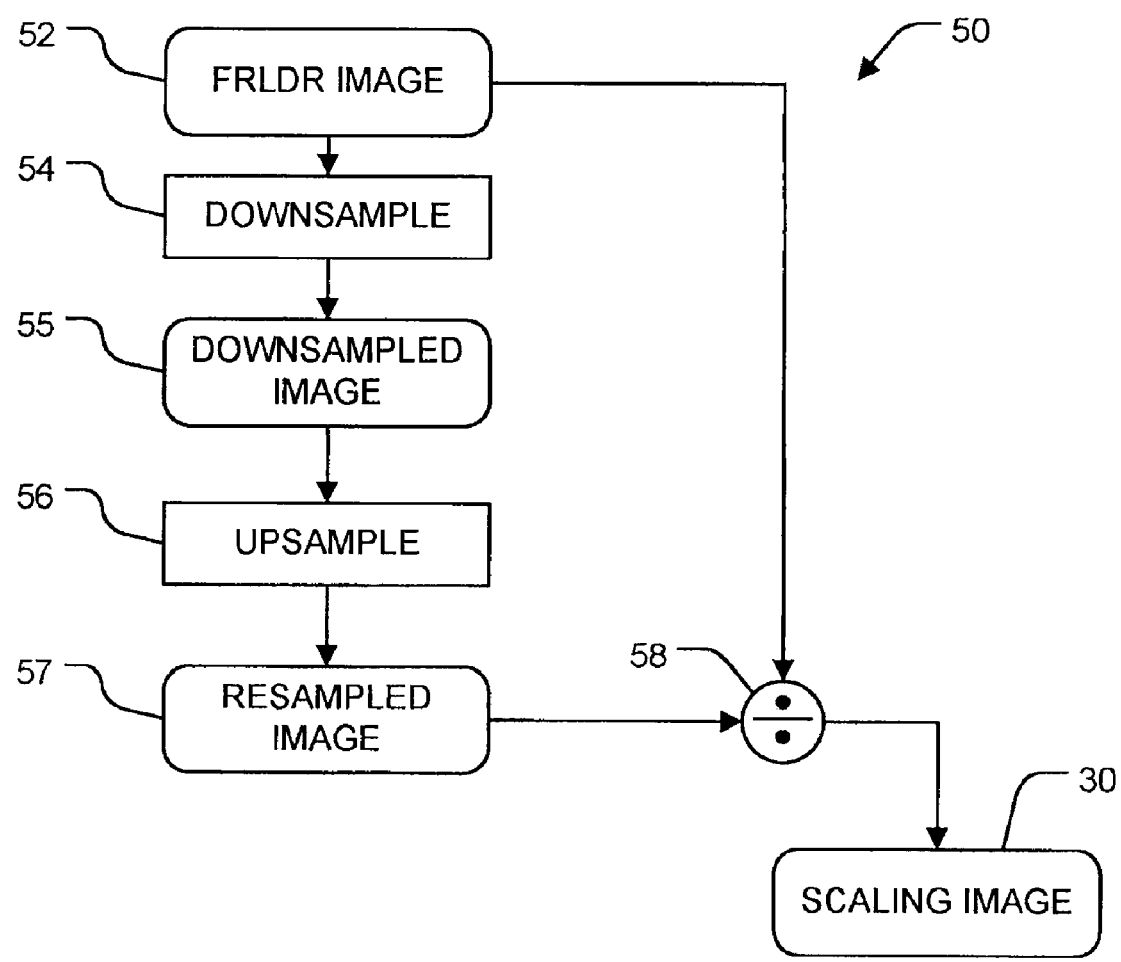
FIG. 3A is a flow chart illustrating one method for obtaining a scaling image of the type used in the method of FIG. 3.

Block 26 may perform any of various suitable methods for extracting information regarding high spatial frequency components of FRLDR image 12. For example, block 26 may apply a rational convolution filter to the data of FRLDR image 12. FIG. 3A illustrates an example method 50 for extracting information regarding high spatial frequency components of FRLDR image 12. Method 50 operates on the decoded and color-converted FRLDR image 52 by downsampling in block 54 to yield downsampled image 55.

Downsampled image 55 has a resolution low enough that the high-frequencies of interest are substantially removed. For example, downsampled image 55 may have a resolution equal to that of LRHDR image 14. In block 56, downsampled image 55 is upsampled to yield a resampled image 57 having a resolution equal to that of FRLDR image 53. Upsampling block 56 preferably applies an upsampling algorithm that introduces few spurious high frequencies. Ideally, spatial frequencies higher than the resolution limit of downsampled image 55 are substantially absent from resampled image 57. For example, block 56 may perform upsampling using a bilinear interpolation to minimize introduction of spurious high frequencies into resampled image 57.

In block 58, resampled image 57 is combined with FRLDR image 53 to yield scaling image 30. In the illustrated embodiment, block 58 divides each pixel value of FRLDR image 53 by the value of a corresponding pixel in resampled image 57.

Figure 4:
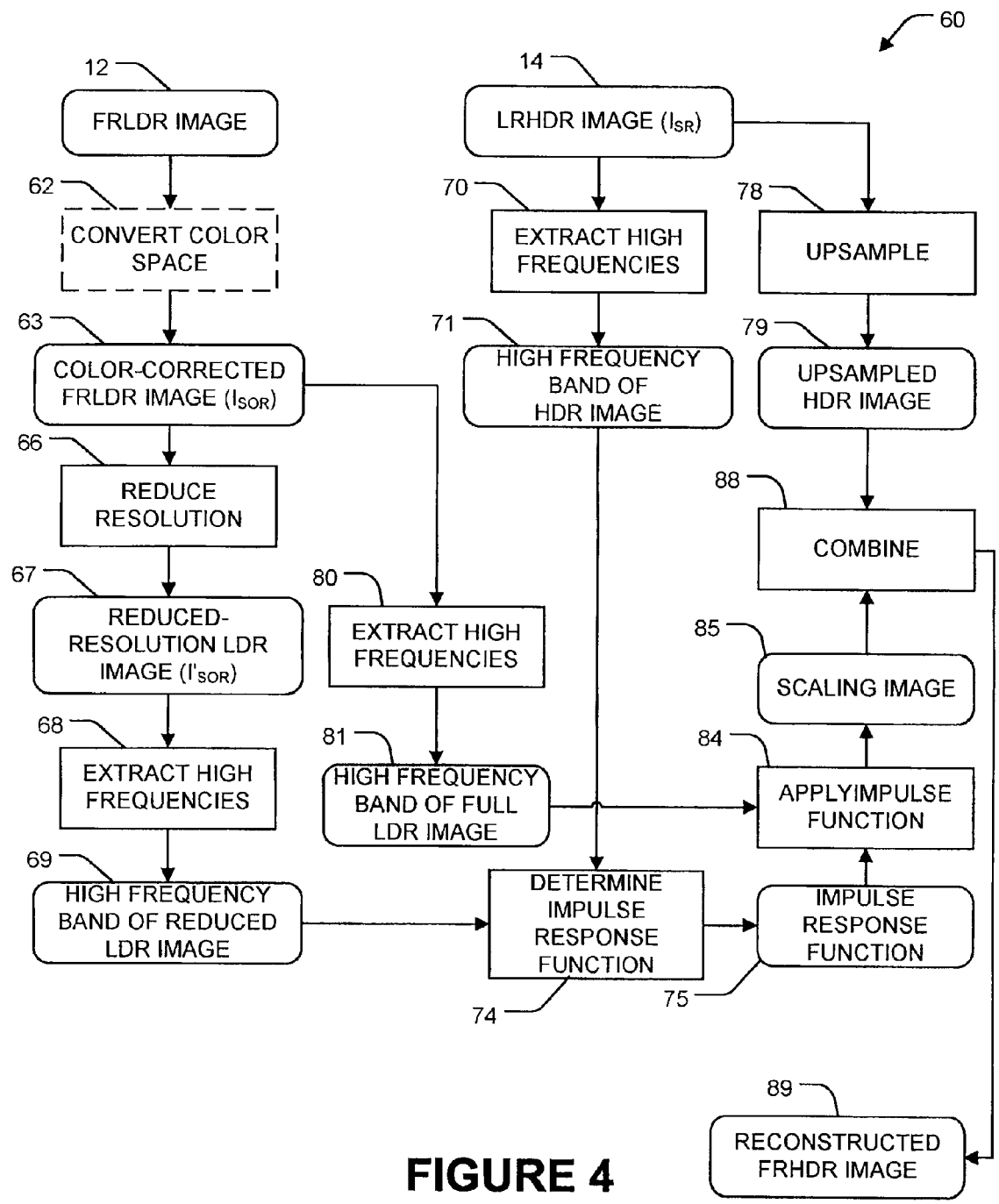
FIG. 4 is a flow chart illustrating a method for recovering high-dynamic-range (HDR) data from the FIG. 1 data structure according to a more detailed embodiment of the invention.

FIG. 4 illustrates a method 60 for reconstructing high dynamic range images that can be used even in cases where lower-dynamic-range image 12 has been created with the use of a tone-mapping operator that is complex or unknown. Method 60 compares characteristics of FRLDR image 12 and LRHDR image 14 to obtain an approximate impulse-response for the tone-mapping operator used in the creation of FRLDR image 12.

If necessary, as described above, in block 62 method 60 converts the color space of FRLDR image 12 to be compatible with the color space of LRHDR image 14 to yield color-corrected FRLDR image 63 that is used as the basis for further processing.

Comparing FRLDR image 12 and LRHDR image 14 to obtain an approximate impulse-response is facilitated by providing a version of FRLDR image 12 that is equal in resolution to LRHDR image 14. Further, since LRHDR image 14 lacks the highest spatial frequencies of FRLDR image 12, there is nothing in LRHDR image 14 to compare to those highest spatial frequencies. Method 60 obtains an approximate impulse-response by comparing information regarding at least the highest spatial frequencies that are present in both FRLDR image 12 and LRHDR image 14.

In block 66 the resolution of color-corrected FRLDR image 63 is reduced (e.g. by downsampling) to yield reduced-resolution LDR image 67. High spatial frequencies are extracted from reduced-resolution LDR image 67 in block 68 to yield the high-frequency band 69 of reduced-resolution LDR image 67.

In block 70 high frequencies are extracted from LRHDR image 14 to yield the high-frequency band 71 of LRHDR image 14. Block 74 compares high-frequency bands 69 and 71 to yield an impulse function 75. One way to perform this block 74 comparison is described below with reference to FIG. 4A.

In block 78, LRHDR image 14 is upsampled to yield upsampled HDR image 79 having the desired resolution. The resolution of upsampled HDR image 79 is typically equal to the resolution of FRLDR image 12 and is greater than that of LRHDR image 14. Upsampled HDR image 79 lacks information about higher spatial frequencies. This information is obtained from FRLDR image 12 using impulse-response function 75. In block 80, high spatial frequencies are extracted from color-corrected FRLDR image 63 to yield the high frequency band 81 of FRLDR image 12.

In cases where FRLDR image 12 is provided in a format in which a higher-frequency band of spatial frequencies is stored separately then higher frequency bands may optionally be extracted directly from the stored/encoded image format without the requirement of a spatial filtering or other step for extracting the higher spatial frequencies.

In block 84, impulse function 75 is applied to high-frequency band 81 to yield scaling image 85. A quantization threshold may be applied in block 84 to obtain scaling image 85. In such embodiments, impulse function 75 is applied to pixels in high frequency band 81 having values at least equal to (or greater than) the applicable quantization threshold. In some embodiments, the applicable quantization threshold is determined from a quantization threshold table. In block 88, scaling image 85 is combined with upsampled HDR image 79 to yield reconstructed full-resolution, high-dynamic-range (FRHDR) image 89.

Figure 4A:
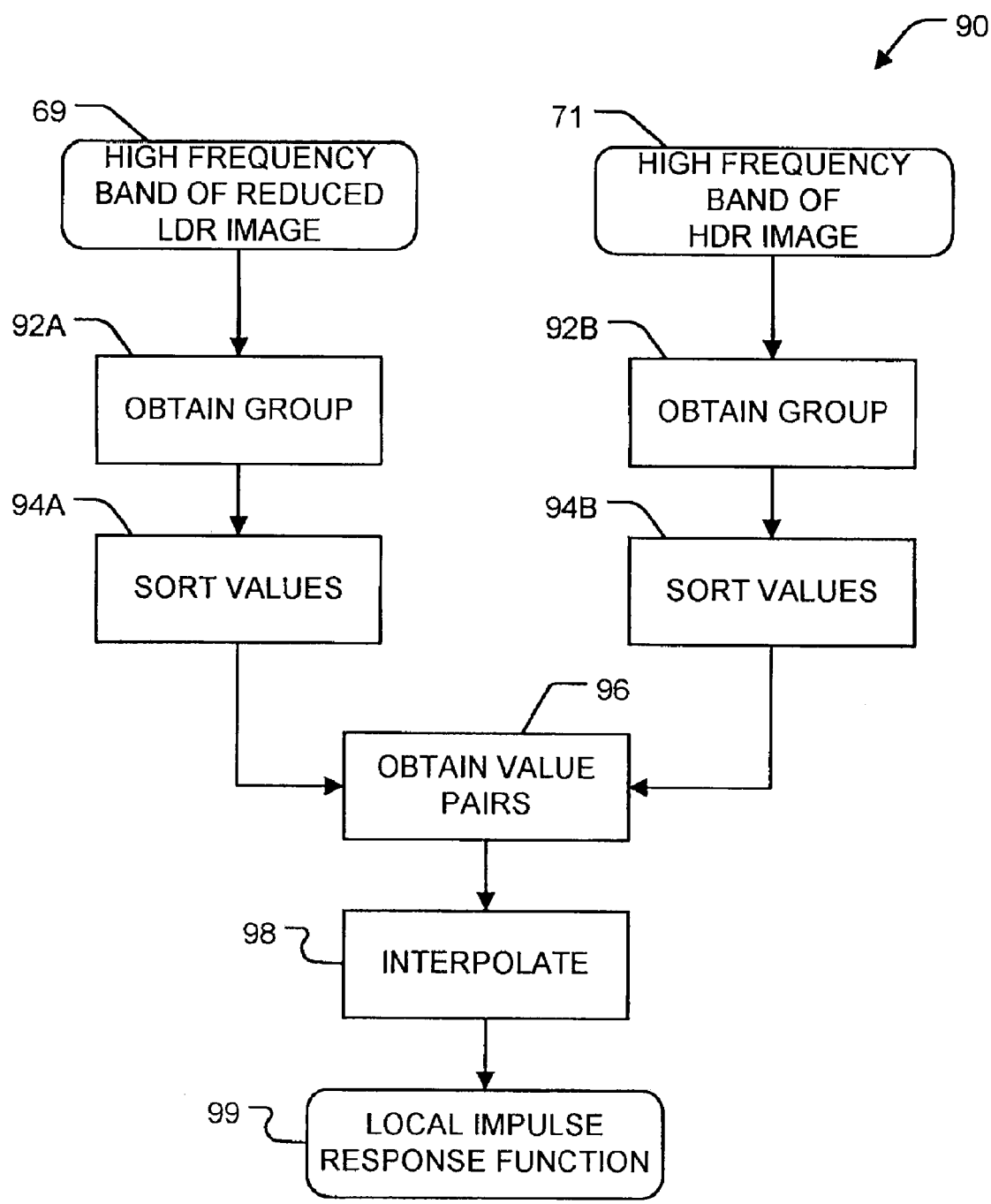
FIG. 4A is a flow chart illustrating a method for obtaining a local impulse-response function of the type used in the method of FIG. 4.

In general, impulse-response function 75 can be position-dependent (i.e. dependent on position within an image). Therefore, in preferred embodiments, method 60 determines impulse-response function 75 as a function of position. FIG. 4A shows a method 90 for obtaining an approximate local impulse-response function from high-frequency bands 69 and 71. Blocks 92A and 92B involve obtaining groups of pixel values from high-frequency bands 69 and 71 respectively. The pixel values used are preferably luminance (gray) values. The block 92A, 92B groups may include all pixels taken from within a square or rectangular region of a high-frequency band 69. 71, for example, although this is not mandatory. The regions may have other shapes. The block 92A, 92B groups may each include all pixel values within a defined region of the corresponding high-frequency band 69, 71 or selected pixels. For example, the block 92A. 92B groups may include every second, third, or $N^{th}$ pixel in every second, third, or $M^{th}$ row within the defined region.

Blocks 94A and 94B involve sorting the pixel values from the block 92A, 92B groups into lists (e.g. in the order of their luminance values). Block 96 obtains pairs of values that have corresponding index positions in the block 94A, 94B sorted lists. Block 96 may take all pairs of values but preferably takes a reduced selection of the pairs of values. For example, block 96 may involve obtaining pairs of values comprising every $P^{th}$ value from each of the block 94A, 94B sorted lists. In some embodiments, block 96 selects in the range of 20-50 pairs of values that are spaced-apart between the minimum pixel values (i.e. at one end of the block 94A, 94B sorted lists) and the maximum pixel values (i.e. at the opposing end of the block 94A, 94B sorted lists).

A prototype embodiment obtains block 92A, 92B groups of 4096 pixel values (from regions of high frequency bands 69, 71 that are 64 pixels by 64 pixels), places the pixel values in arrays that are 4096 entires long, sorts the arrays (blocks 94A, 94B), and then, in block 96, obtains every $164^{th}$ entry from each of the block 94A, 94B sorted arrays to provide a set of 25 monotonically-increasing coordinate pairs.

It has been found that acceptable results can be obtained by taking pixels within regions that are 64 pixels by 64 pixels or larger in size (e.g. regions containing about 4000 or more pixels).

Figure 5:
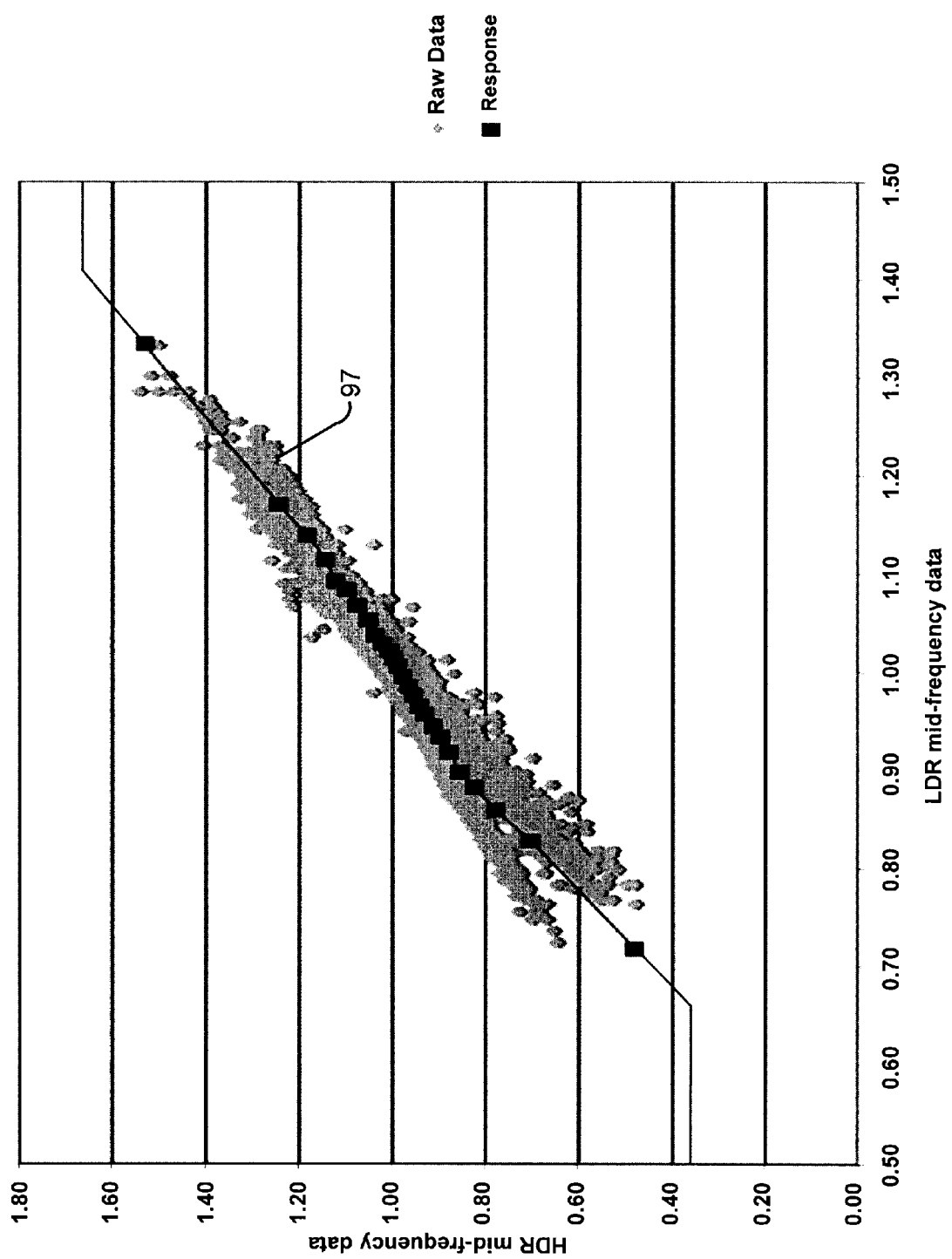
FIG. 5 is a plot illustrating an approximate local impulse-response function.

FIG. 5 is a plot showing the correlation between sorted pixel values from corresponding regions of high-frequency bands 69 and 71, for a set of example data. In the illustrated embodiment, value pairs selected in block 96 are indicated by rectangles. A local impulse-response function 99 is obtained by fitting a curve or curves (by interpolation (shown in block 98) or otherwise) to the selected pixel value pairs. By way of example, linear or cubic interpolation may be used to obtain an approximate impulse-response that matches a set of coordinates. In FIG. 5, line 97 is an approximate impulse-response obtained by linear interpolation (block 98) between the block 96 selected pixel value pairs.

It is desirable to extrapolate the impulse-response functions to deal with pixel values outside of the range of the pixel value pairs used to derive the impulse-response function. This may be done, for example, at the upper end by extrapolating from the largest block 96 value pair by a distance that is ½ of the distance between the largest and second-largest block 96 value pairs. This may be done at the lower end by extrapolating from the smallest block 96 value pair by a distance that is ½ of the distance between the smallest and second-smallest block 96 value pairs.

In some embodiments, the slope of the impulse-response function is capped in order to reduce excessive quantization noise in high gradient areas. For example, the input response functions may be scaled, if necessary, to reduce the average slope of the impulse-response function to below a threshold slope. For example, the threshold slope may be about 1:5.

It would be possible (although very computationally-intensive) to determine a different local impulse-response function for every pixel. Significant computation can be saved by applying the response functions of the nearest neighboring blocks and interpolating the results. This can be done with little loss of quality assuming that the impulse-response function is reasonably slowly-varying with position within an image.

Figure 4B:
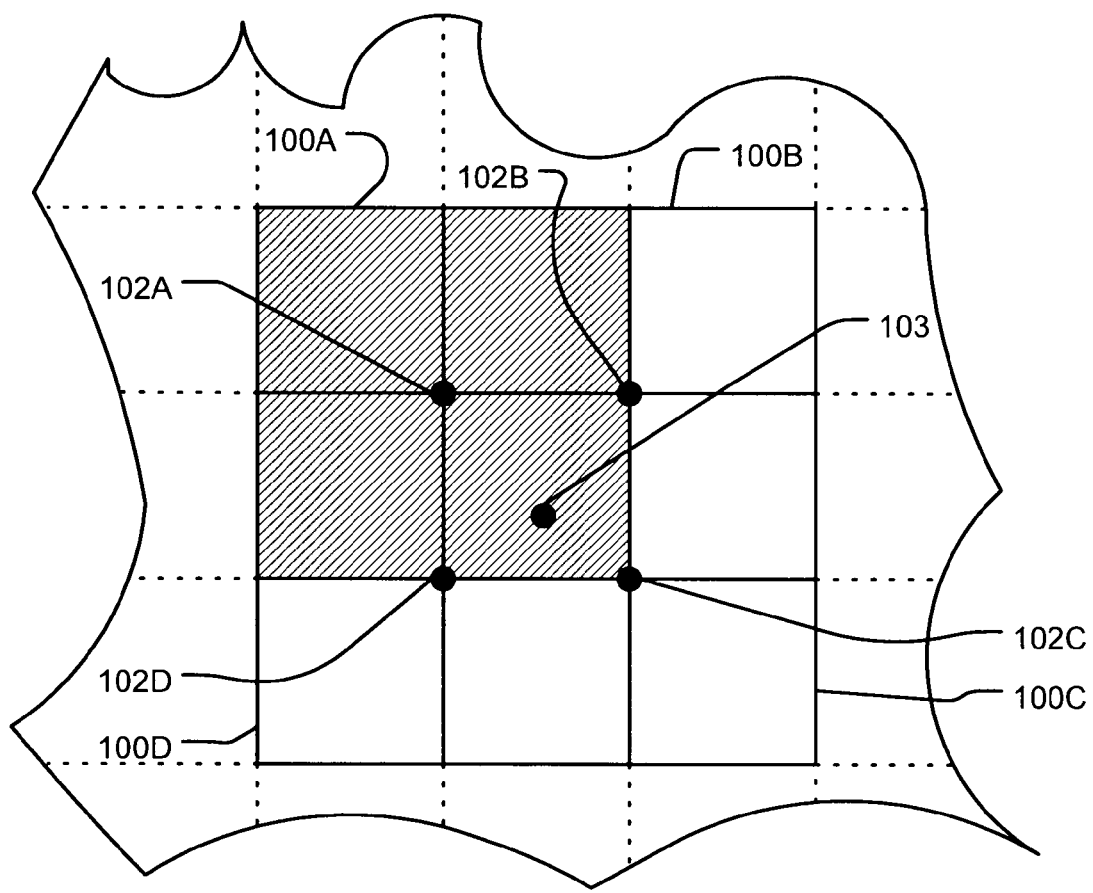
FIG. 4B is a schematic view of a portion of an image.

FIG. 4B illustrates one approach to determining impulse-response functions applicable to individual pixels. An image is divided into a plurality of regions 100. In FIG. 4B, the four regions 100 are individually identified as 100A, 100B, 100C and 100D and region 100A is shaded. In the illustrated embodiment, regions 100 are square. A local impulse-response function is determined for each region 100, as described above. The impulse-response function is associated with a representative pixel 102 of the region 100. Representative pixels 102 are preferably located centrally in their corresponding regions 100. FIG. 4B shows four representative pixels 102A, 102B, 102C and 102D, each associated with a corresponding one of regions 100A. 100B, 100C and 100D.

As seen in FIG. 4B, regions 100 overlap with one another. In the illustrated embodiment, regions 100 overlap adjoining regions by 50%, so that all pixels away from the edges of the image belong to four regions. Preferably, regions 100 overlap with adjacent regions by at least 25%. The impulse-response function for a pixel 103 having an arbitrary location may be determined from the local impulse-response functions corresponding to the one or more representative pixels 102 that are closest to the pixel 103.

In the illustrated case, pixel 103 is located between representative pixels 102A, 102B, 102C and 102D (i.e. pixel 103 is overlapped by regions 100A, 100B, 100C, 100D). An impulse-response function appropriate to pixel 103 may be obtained by interpolating the impulse-response functions corresponding to representative pixels 102A, 102B, 102C and 102D based upon the distances between pixel 103 and each of pixels 102A, 102B, 102C and 102D. The value of pixel 103 may be applied as an input to the impulse-response functions corresponding to each of representative pixels 102A, 102B, 102C and 102D. The four results may be combined to provide a result appropriate to pixel 103 by linear interpolation.

Figure 6:
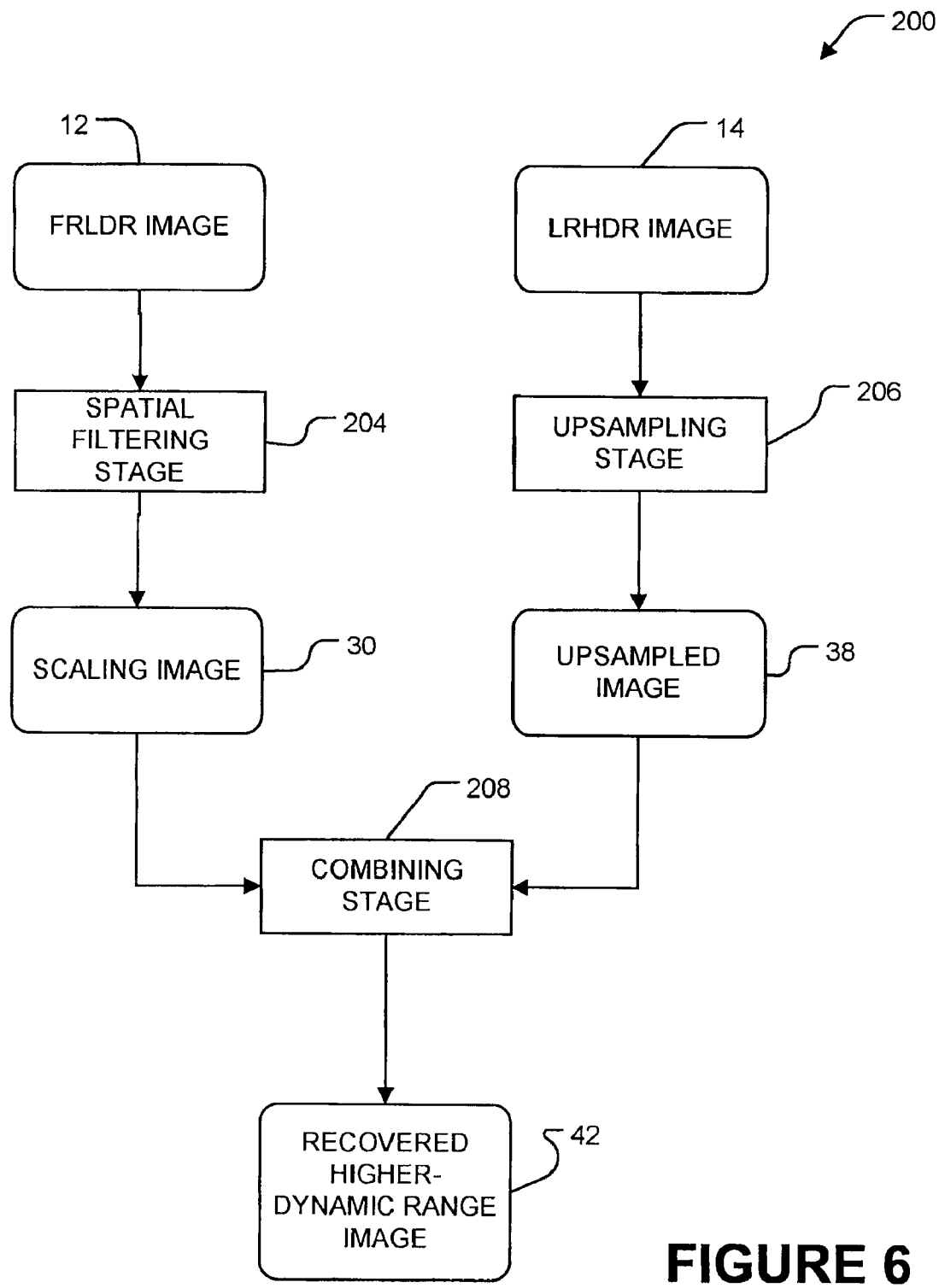
FIG. 6 illustrates apparatus according to an embodiment of the invention.

FIG. 6 shows apparatus 200 according to an embodiment of the invention. In some embodiments, apparatus 200 is integrated with a DVD player, computer display, video player, television, or other image-displaying apparatus. Apparatus 200 comprises a spatial filtering stage 204 that receives FRLDR image data 12 and processes the FRLDR image data 12 to yield high frequency scaling image 30. Apparatus 200 also comprises upsampling stage 206 that receives LRHDR image data 14 and upsamples to obtain upsampled image 38. A combining stage 208 combines scaling image 30 and upsampled image 38 to yield a reconstructed image data 42. Apparatus 200 optionally includes a display 209 which displays reconstructed image data 42. Stages 204, 206 AND 208 of apparatus 200 may be implemented in suitable image-processing hardware or software being executed on a suitable data processor or on combinations thereof.

Figure 7:
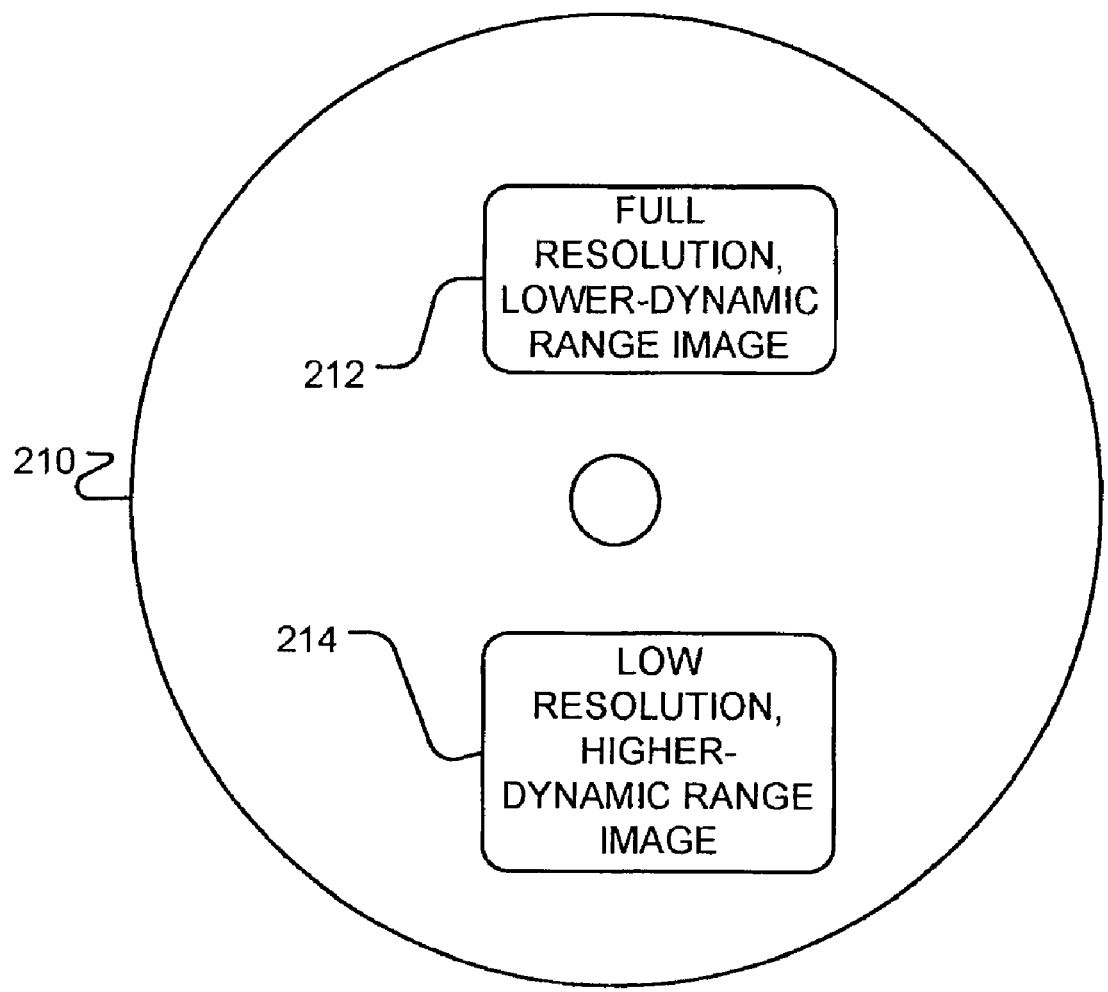
FIG. 7 illustrates a medium according to an embodiment of the invention.

Some embodiments of the invention comprise media having both a full resolution, lower dynamic range (FRLDR) representation of an image and a lower resolution, higher-dynamic-range (LRHDR) representation of the image. The LRHDR representation has a lower resolution and a higher dynamic range than the FRLDR representation. The FRLDR representation may be viewed on lower-dynamic-range displays. The LRHDR representation may be used together with the FRLDR representation as described above to obtain full resolution higher-dynamic-range images for display on higher-dynamic range displays. FIG. 7 shows a medium 210 (which could, for example, comprise a DVD, magnetic storage device, flash RAM, CD or the like) which includes both a FRLDR representation 212 of an image and a LRHDR representation 214 of the same image. In some embodiments the FRLDR representation of the image has at least 16 times more pixels than the LRHDR representation.

Certain implementations of the invention comprise computer processors which execute software instructions which cause the processors to perform a method of the invention. For example, one or more processors in a DVD-player, computer, television, data projector, or other image-displaying computerized device may implement the methods of the invention by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, media such as magnetic data storage media including floppy diskettes, hard disk drives, optical data storage media including CD ROMs, DVDs, electronic data storage media including ROMs, flash RAM, or the like. Program products may be distributed by way of transmission-type media such as digital or analog communication links. The software instructions on a program product may be optionally compressed and/or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. Apparatus for reconstructing a higher-dynamic-range image from a full resolution, lower dynamic range (FRLDR) representation of an image and a lower resolution, higher-dynamic-range (LRHDR) representation of the image, the LRHDR representation having a lower resolution and a higher dynamic range than the FRLDR representation, the apparatus comprising:
a spatial filtering unit configured to generate a scaling image comprising information relating to high spatial frequency components of the FRLDR representation;
an upsampling unit configured to generate an upsampled image from the LRHDR representation; and,
a combining unit configured to combine the scaling image and the upsampled image to obtain a reconstructed higher-dynamic-range image,
wherein each of the spatial filtering unit, upsampling unit and combining unit comprises image-processing hardware, software stored on a non-transitory computer-readable medium and executable by a data processor, or a combination thereof.

2. Apparatus according to claim 1 comprising a display wherein the apparatus is configured to display the reconstructed higher-dynamic range image on the display.

3. Apparatus according to claim 1 wherein the FRLDR representation is created from an original full resolution, high-dynamic-range representation of the image using a tone-mapping operation and wherein the spatial filtering unit is configured to perform an inverse tone-mapping operation.

4. Apparatus according to claim 1 wherein the spatial filtering unit is configured to:
downsample the FRLDR representation to obtain a downsampled image having a resolution sufficiently low to comprise only spatial frequency components below a desired spatial frequency level;
upsample the downsampled image to obtain a resampled image; and
combine the resampled image and the FRLDR representation to generate the scaling image.

5. Apparatus according to claim 4 wherein the spatial filtering unit is configured to divide each pixel value of the FRLDR representation by a corresponding pixel value of the resampled image.

6. Apparatus according to claim 4 wherein an average of pixel values in the scaling image is 1.

7. Apparatus according to claim 1 wherein the combining unit is configured to multiply each pixel value of the scaling image with a corresponding pixel value of the upsampled image.

8. Apparatus according to claim 1 wherein the spatial filtering unit is configured to apply a convolution filter to the FRLDR representation.

9. Apparatus according to claim 1 wherein the spatial filtering unit is configured to convert a color space of the FRLDR representation into a color space of the LRHDR representation.

10. Apparatus according to claim 1 wherein the spatial filtering unit is configured to:
determine an impulse-response function from the FRLDR representation and the LRHDR representation;
extract high spatial frequency components of the FRLDR representation; and
multiply each pixel value of the extracted high spatial frequency components by a corresponding value of the impulse-response function to generate the scaling image.

11. Apparatus according to claim 10 wherein the spatial filtering unit is configured to apply a quantization threshold to the high spatial frequency components.

12. Apparatus according to claim 11 wherein the spatial filtering unit is configured to:
extract high spatial frequency components of the LRHDR representation to obtain a high frequency band of the LRHDR representation;
reduce a resolution of the FRLDR representation to obtain a reduced resolution low-dynamic-range image;
extract high spatial frequency components of the reduced resolution low-dynamic-range image to obtain a high frequency band of the reduced resolution low-dynamic-range image; and
process the high frequency band of the LRHDR representation and the high frequency band of the reduced resolution low-dynamic-range image to determine the impulse-response function.

13. Apparatus according to claim 12 wherein the spatial filtering unit is configured to:
select a group of pixels from within a spatial region of the high frequency band of the LRHDR representation and selecting a corresponding group of pixels from within the spatial region of the high frequency band of the reduced resolution low-dynamic-range image;
sort the group of pixels and the corresponding group of pixels by pixel value to obtain a pair of sorted arrays defining a regional impulse-response function corresponding to the spatial region; and,
combine one or more regional impulse-response functions to obtain the impulse-response function.

14. Apparatus according to claim 13 wherein the spatial filtering unit is configured to select and sort groups of pixels for a plurality of spatial regions.

15. Apparatus according to claim 13 wherein the spatial filtering unit is configured to:
select a plurality of pairs of pixel values from the pair of sorted arrays, each pair of pixel values comprising pixel values having a common index within the pair of sorted arrays; and,
interpolate between the plurality of pairs of pixel values.

16. Apparatus according to claim 13 wherein the spatial filtering unit is configured to:
determine a regional impulse-response function value for each of a plurality of regions that include the pixel; and,
computing a weighted combination of the regional impulse-response function values.

17. Apparatus according to claim 16 wherein the spatial filtering unit is configured to weight the regional impulse-response function values based on distances of the pixel from central points in the regions to which the regional impulse-response function values correspond.

18. Apparatus according to claim 15 wherein the spatial filtering unit is configured to extrapolate the regional impulse-response function past at least one of the smallest and largest ones of the pairs of pixel values.

19. A non-transitory computer-readable medium with a set of instructions stored thereon, that, when loaded into an electronic controller, cause the controller to perform the steps of:

receiving a full resolution, lower dynamic range (FRLDR) representation of the image and a lower resolution, higher-dynamic-range (LRHDR) representation of the image, the LRHDR representation having a lower resolution and a higher dynamic range than the FRLDR representation;

processing at least the FRLDR representation to obtain a scaling image comprising information relating to high spatial frequency components of the FRLDR representation;

upsampling the LRHDR representation to obtain an upsampled image; and combining the scaling image and the upsampled image to obtain a reconstructed higher-dynamic-range image.

20. Apparatus according to claim 1 wherein the apparatus is integrated with a DVD player.

21. Apparatus according to claim 1 wherein the apparatus is integrated with a video player.

22. Apparatus according to claim 1 wherein the apparatus is integrated with a computer display, the apparatus configured to display the reconstructed higher-dynamic range image on the computer display.

23. Apparatus according to claim 1 wherein the apparatus is integrated with a television having a display, the apparatus configured to display the reconstructed higher-dynamic range image on the display.

24. Apparatus according to claim 1 wherein the apparatus is integrated with an image-displaying device having a display, the apparatus configured to display the reconstructed higher-dynamic range image on the display.

* * * * *